(12) United States Patent
Duranleau-Hendrickx

(10) Patent No.: US 11,454,176 B2
(45) Date of Patent: Sep. 27, 2022

(54) SYSTEM AND METHOD FOR MONITORING A BLEED VALVE OF A GAS TURBINE ENGINE

(71) Applicant: PRATT & WHITNEY CANADA CORP., Longueuil (CA)

(72) Inventor: Louis Duranleau-Hendrickx, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 309 days.

(21) Appl. No.: 16/778,574

(22) Filed: Jan. 31, 2020

(65) Prior Publication Data

US 2021/0270190 A1 Sep. 2, 2021

(51) Int. Cl.
*F02C 9/18* (2006.01)
*F01D 17/08* (2006.01)
*G01M 15/14* (2006.01)

(52) U.S. Cl.
CPC ............ *F02C 9/18* (2013.01); *F01D 17/08* (2013.01); *G01M 15/14* (2013.01); *F05D 2220/32* (2013.01); *F05D 2260/80* (2013.01); *F05D 2270/101* (2013.01); *F05D 2270/304* (2013.01)

(58) Field of Classification Search
CPC ...... F02C 9/18; F02C 6/08; F02C 6/00; F01D 21/00; F05D 2260/80; F05D 2220/32; F05D 2270/304; G01M 15/14
See application file for complete search history.

(56) References Cited

U.S. PATENT DOCUMENTS

| 6,557,400 B2 | 5/2003 | Xiong et al. | |
| 7,328,098 B1* | 2/2008 | VanderLeest | F02C 9/18 60/785 |
| 9,068,463 B2 | 6/2015 | Pandey et al. | |
| 2013/0131951 A1* | 5/2013 | Pandey | F02C 9/52 701/100 |
| 2017/0321570 A1 | 11/2017 | Scothern | |

* cited by examiner

*Primary Examiner* — Todd E Manahan
*Assistant Examiner* — Rodolphe Andre Chabreyrie
(74) *Attorney, Agent, or Firm* — Norton Rose Fulbright Canada LLP

(57) ABSTRACT

There are described methods, systems, and assemblies for monitoring a bleed valve of a gas turbine engine. The method comprises determining a rate of change of a gas generator speed of the gas turbine engine; determining a rate of change of a parameter indicative of engine power of the gas turbine engine; comparing at least one ratio based on the rate of change of the gas generator speed and the rate of change of the parameter indicative of engine power to at least one range of values; detecting a modulation delay of the bleed valve when the at least one ratio is within the at least one range of values; and transmitting a signal indicative of the bleed valve malfunction in response to detecting the modulation delay.

20 Claims, 6 Drawing Sheets

SYSTEM AND METHOD FOR MONITORING A BLEED VALVE OF A GAS TURBINE ENGINE

TECHNICAL FIELD

The present disclosure relates generally to monitoring bleed valves, and more particularly to detecting bleed valve malfunctions.

BACKGROUND OF THE ART

Gas turbine engines comprise one or more bleed valve for bleeding air from a compressor. The bleed valve is driven to an open position at low pressure conditions and to a closed position at high pressure conditions. There is a need to improve techniques for detecting malfunctions in bleed valves of gas turbine engines.

SUMMARY

In accordance with a broad aspect, there is provided a method for monitoring a bleed valve of a gas turbine engine. The method comprises determining a rate of change of a gas generator speed of the gas turbine engine; determining a rate of change of a parameter indicative of engine power of the gas turbine engine: comparing at least one ratio based on the rate of change of the gas generator speed and the rate of change of the parameter indicative of engine power to at least one range of values; detecting a modulation delay of the bleed valve when the at least one ratio is within the at least one range of values; and transmitting a signal indicative of the bleed valve malfunction in response to detecting the modulation delay.

In accordance with another broad aspect, there is provided a system for monitoring a bleed valve of a gas turbine engine. The system comprises a processing unit and a non-transitory computer-readable medium having stored thereon program instructions. The instructions are executable by the processing unit for determining a rate of change of a gas generator speed of the gas turbine engine; determining a rate of change of a parameter indicative of engine power of the gas turbine engine; comparing at least one ratio based on the rate of change of the gas generator speed and the rate of change of the parameter indicative of engine power to at least one range of values; detecting a modulation delay of the bleed valve when the at least one ratio is within the at least one range of values; and transmitting a signal indicative of the bleed valve malfunction in response to detecting the modulation delay.

In accordance with yet another broad aspect, there is provided an assembly comprising a gas turbine engine, a bleed valve in the gas turbine engine, at least one sensor coupled to the gas turbine engine for measuring engine parameters, and a controller coupled to the at least one sensor. The controller is configured for determining a rate of change of a gas generator speed of the gas turbine engine; determining a rate of change of a parameter indicative of engine power of the gas turbine engine; comparing at least one ratio based on the rate of change of the gas generator speed and the rate of change of the parameter indicative of engine power to at least one range of values; detecting a modulation delay of the bleed valve when the at least one ratio is within the at least one range of values; and transmitting a signal indicative of the bleed valve malfunction in response to detecting the modulation delay.

Features of the systems, devices, and methods described herein may be used in various combinations, in accordance with the embodiments described herein. More particularly, any of the above features may be used together, in any combination.

BRIEF DESCRIPTION OF THE DRAWINGS

Reference is now made to the accompanying figures in which.

It will be noted that throughout the appended drawings, like features are identified by like reference numerals.

DETAILED DESCRIPTION

Figure 1:
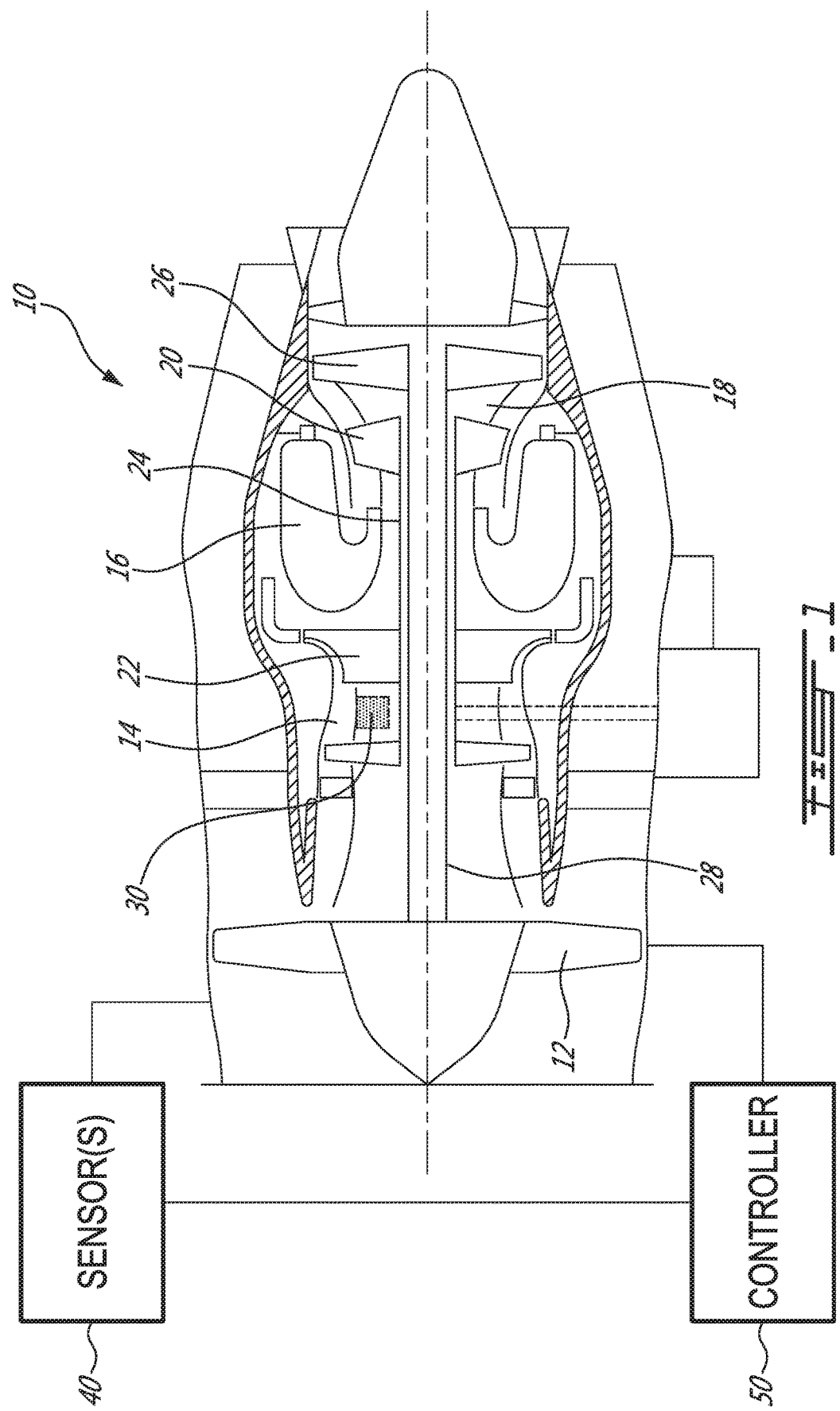
FIG. 1 is a schematic cross-sectional view of an example gas turbine engine.

FIG. 1 illustrates a gas turbine engine 10 of a type preferably provided for use in subsonic flight, generally comprising in serial flow communication, a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. High pressure rotor(s) 20 of the turbine section 18 are drivingly engaged to high pressure rotor(s) 22 of the compressor section 14 through a high pressure shaft 24. Low pressure rotor(s) 26 of the turbine section 18 are drivingly engaged to the fan rotor 12 and to other low pressure rotor(s) (not shown) of the compressor section 14 through a low pressure shaft 28 extending within the high pressure shaft 24 and rotating independently therefrom.

Although illustrated as a turbofan engine, the gas turbine engine 10 may alternatively be another type of engine, for example a turboshaft engine, also generally comprising in serial flow communication a compressor section, a combustor, and a turbine section, and a fan through which ambient air is propelled. A turboprop engine may also apply. In addition, although the engine 10 is described herein for flight applications, it should be understood that other uses, such as industrial or the like, may apply.

The gas turbine engine 10 may comprise one or more bleed valve 30, designed to relieve the back pressure in the compressor section 14, which helps to restore the velocity triangles of the fan and compressor blades closer to design conditions and prevent compressor stall and surge. The bleed valve permits higher mass airflow through the compressor section 14 and reduces the mass flow through the combustor 16 and turbine section 18. This minimizes the tendency to stall or surge. The bleed valve may also be referred to as an air-release valve or a pop-off valve.

Figure 2A:
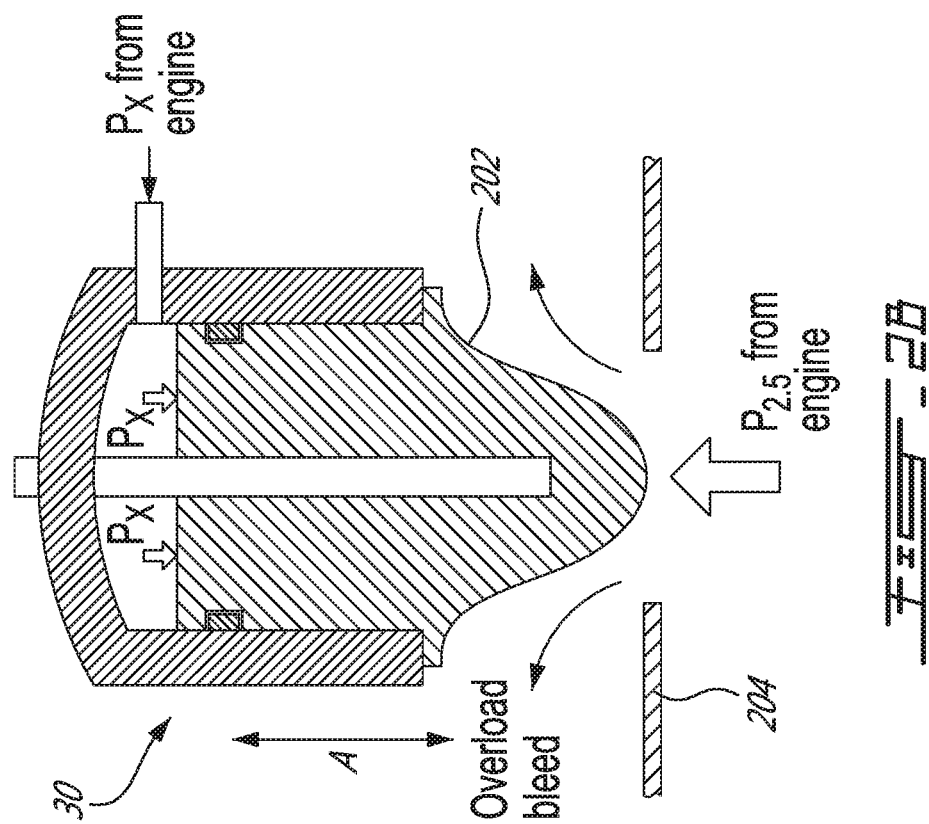
FIGS. 2A-2B are schematic illustrations of an example bleed valve.
Figure 2B:
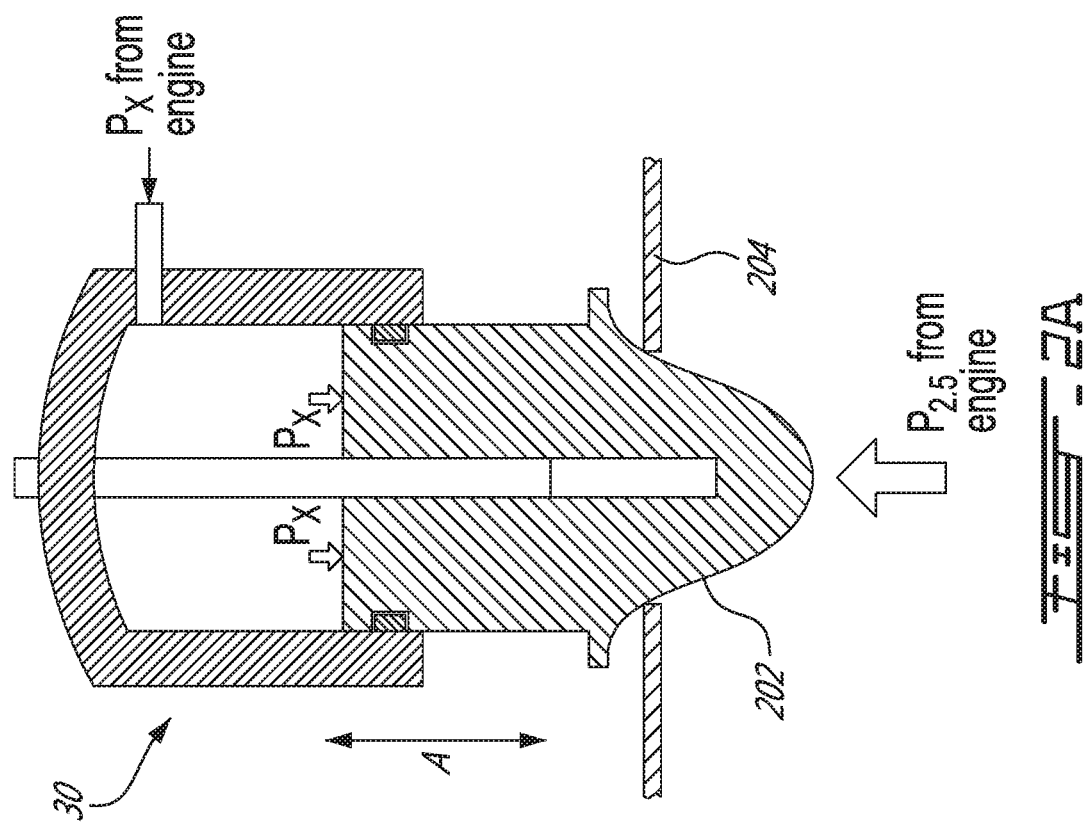

Referring to FIGS. 2A-2B, there is illustrated an example of a bleed valve 30. A piston 202 is displaced along direction A to form a seal with an edge 204 of a piston cavity (FIG. 2A) or to allow fluid into the cavity (FIG. 2B). Two forces act on the piston 202, whereby one force ($F_1$) contributes to closing the valve 30 and one force ($F_2$) contributes to opening the valve 30. When $F_1 > F_2$, the valve 30 closes, when $F_1 < F_2$, the valve opens. $F_1$ corresponds to an intermediate compressor pressure, which may be any pressure between the compressor inlet pressure P1 and the compressor outlet pressure P3. It will be referred to herein as P2.5 for ease of reference. $F_2$ corresponds to Px, which is a pressure that is obtained by mixing a pressure downstream from P2.5, for example P3, with a pressure upstream from P2.5, for example ambient pressure (Pamb). The mixing between P3 and Pamb produces a switching characteristic such that at low speeds, P2.5>Px and at high speeds, P2.5<Px. Depending of the operating type of the bleed valve, the Px closing pressure may also be obtained by others means, for example by a controller opening and closing various metering orifices to control the Px pressure in order to obtain the characteristic such that at low speeds, P2.5>Px and at high speeds, P2.5<Px.

Figure 3:
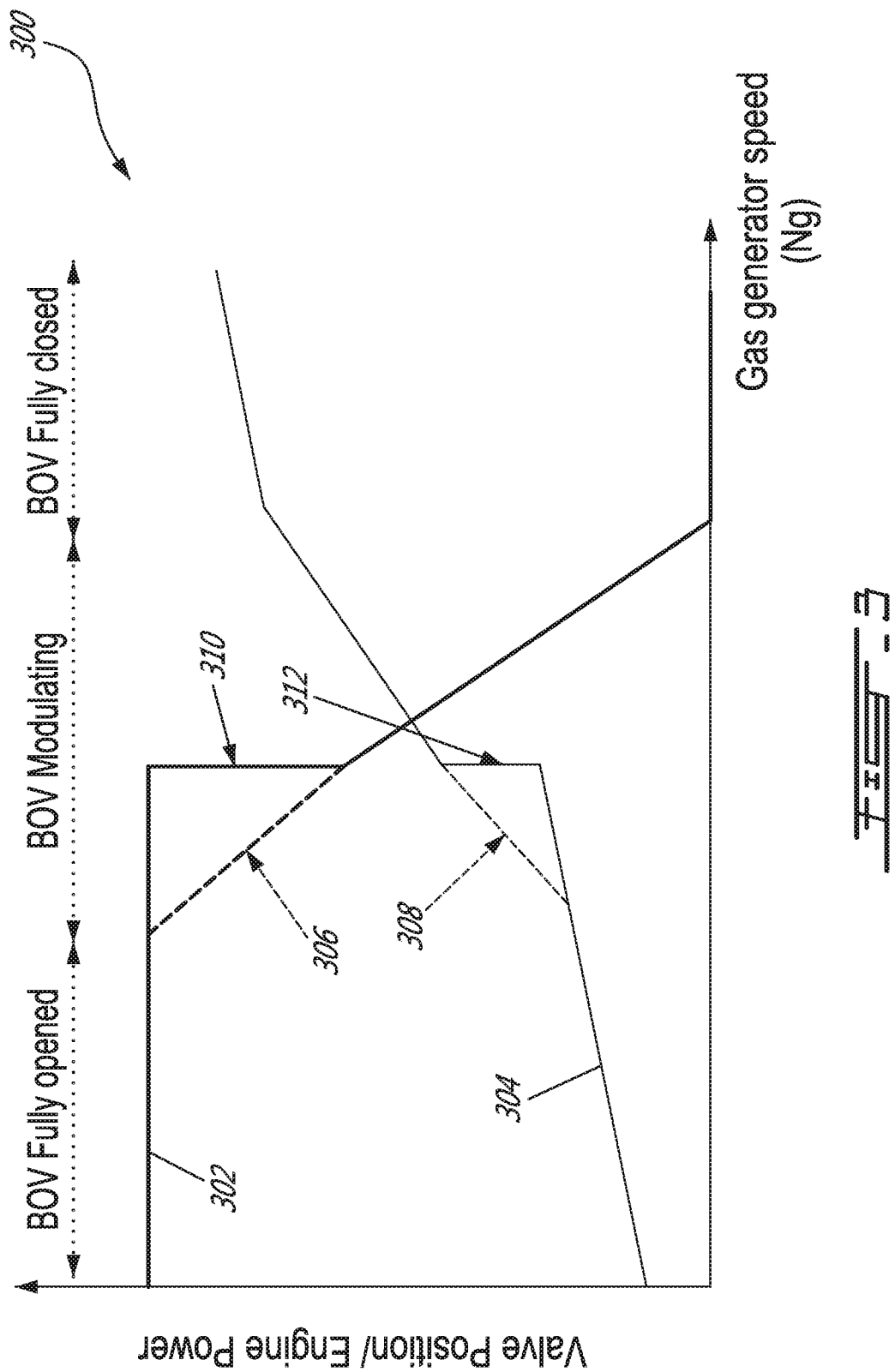
FIG. 3 is a graph showing an example of valve position and engine power as a function of gas generator speed.

One type of valve malfunction that can occur with the bleed valve 30 is a modulation delay. The modulation delay is caused by a sealing issue in the piston cavity, delaying the increase of the closing pressure (Px) and thus delaying the engine gas generator speed at which the bleed valve 30 starts to close. When the sealing is re-established (at a higher engine power), the bleed valve closing pressure Px is quickly built up and the valve 30 closes abruptly. An example of this phenomenon is illustrated in the graph 300 of FIG. 3. Curve 302 illustrates the position of the valve as a function of the gas generator speed (Ng). Curve 304 illustrates engine power as a function of gas generator speed (Ng). Portions 306, 308 of curves 302, 304, respectively, are expected in the case of a smooth valve modulation when there is no modulation delay. Portions 310, 312 of curves 302, 304, respectively, show the effects of the modulation delay. Modulation delay can cause various issues, including sudden power increases and an increased likelihood of engine surge. Therefore, there is a desire to detect a valve malfunction caused by a modulation delay.

Figure 4:
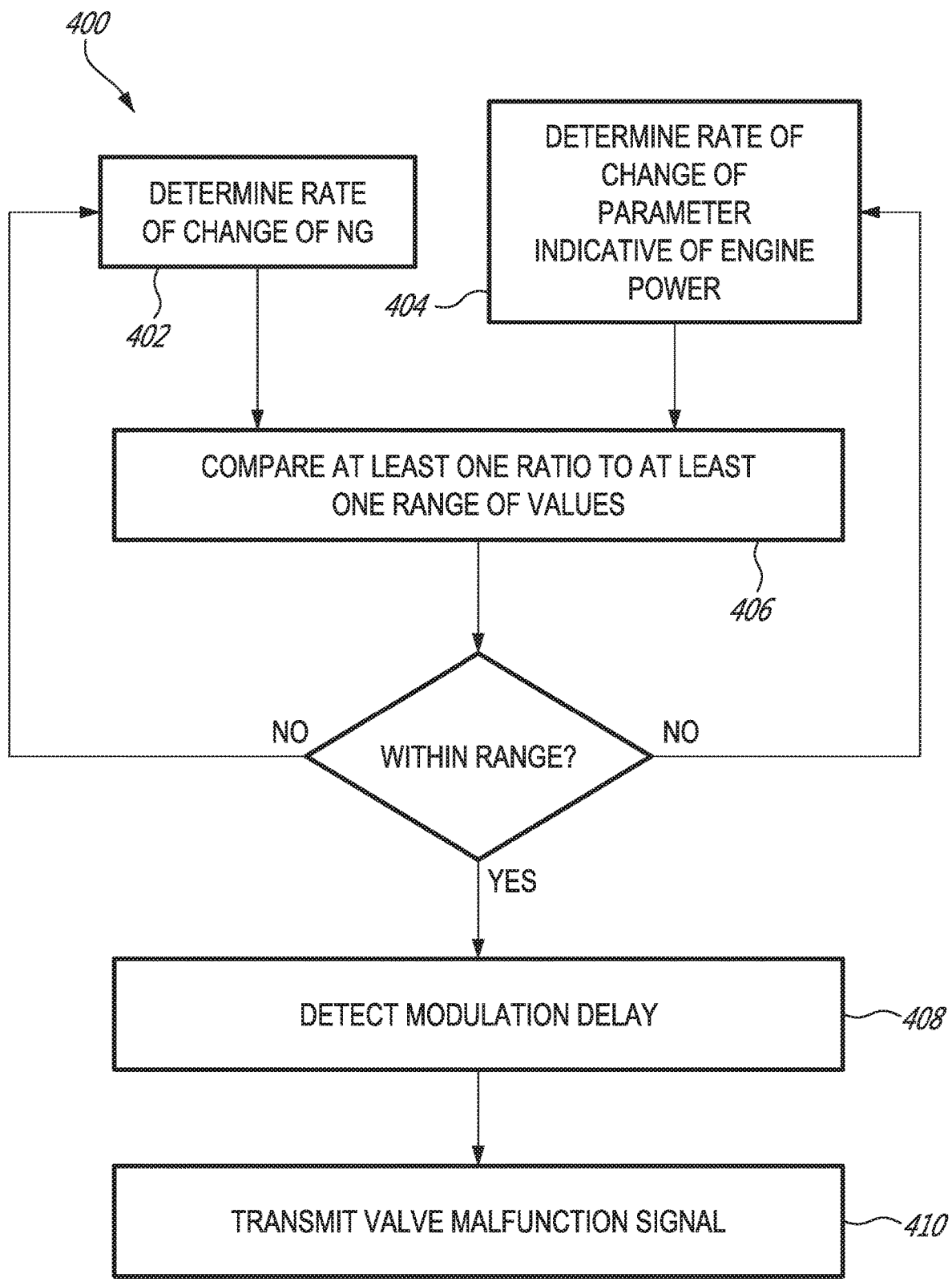
FIG. 4 is a flowchart of an example method for monitoring a bleed valve.

Referring to FIG. 4, there is illustrated a method 400 for monitoring a bleed valve of a gas turbine engine, such as valve 30 of engine 10. Note that the method 400 is also applicable to fully pneumatic bleed valves (i.e. that cannot be directly controlled by a signal). The method 400 may be used to detect valve malfunctions caused by modulation delays. A modulation delay may be referred to as a transient malfunction, which differs from a steady-state malfunction where the valve is stuck in an open state or in a closed state. A transient malfunction is a malfunction that occurs between the fully open and fully closed states, during modulation of the valve as it transitions from one state to the other.

The method 400 uses gas turbine engine parameters to detect the valve malfunction caused by a modulation delay. At step 402, a rate of change of the gas generator speed of the engine (Ng) is determined. At step 404, a rate of change of a parameter indicative of engine power (PIEP) is determined. Steps 402 and 404 may be performed concurrently, as illustrated, or sequentially in any order.

In some embodiments, the parameters determined at steps 402, 404 are determined from data obtained from one or more sensor(s) 40 provided in or around the engine 10. For example, measured sensor data may be transmitted to a controller 50, which may be an engine controller or another controller separate from an engine controller. The rate of change of Ng and/or the rate of change of the PIEP may be instantaneous values from the measured sensor data. The measured sensor data may be filtered by the controller 50 in order to remove noise, for example by taking a rolling or moving average of the data. Other filtering means may also be used. Alternatively, the parameters may be obtained from an engine controller at a separate device for the purposes of performing the present method 400.

Figure 5:
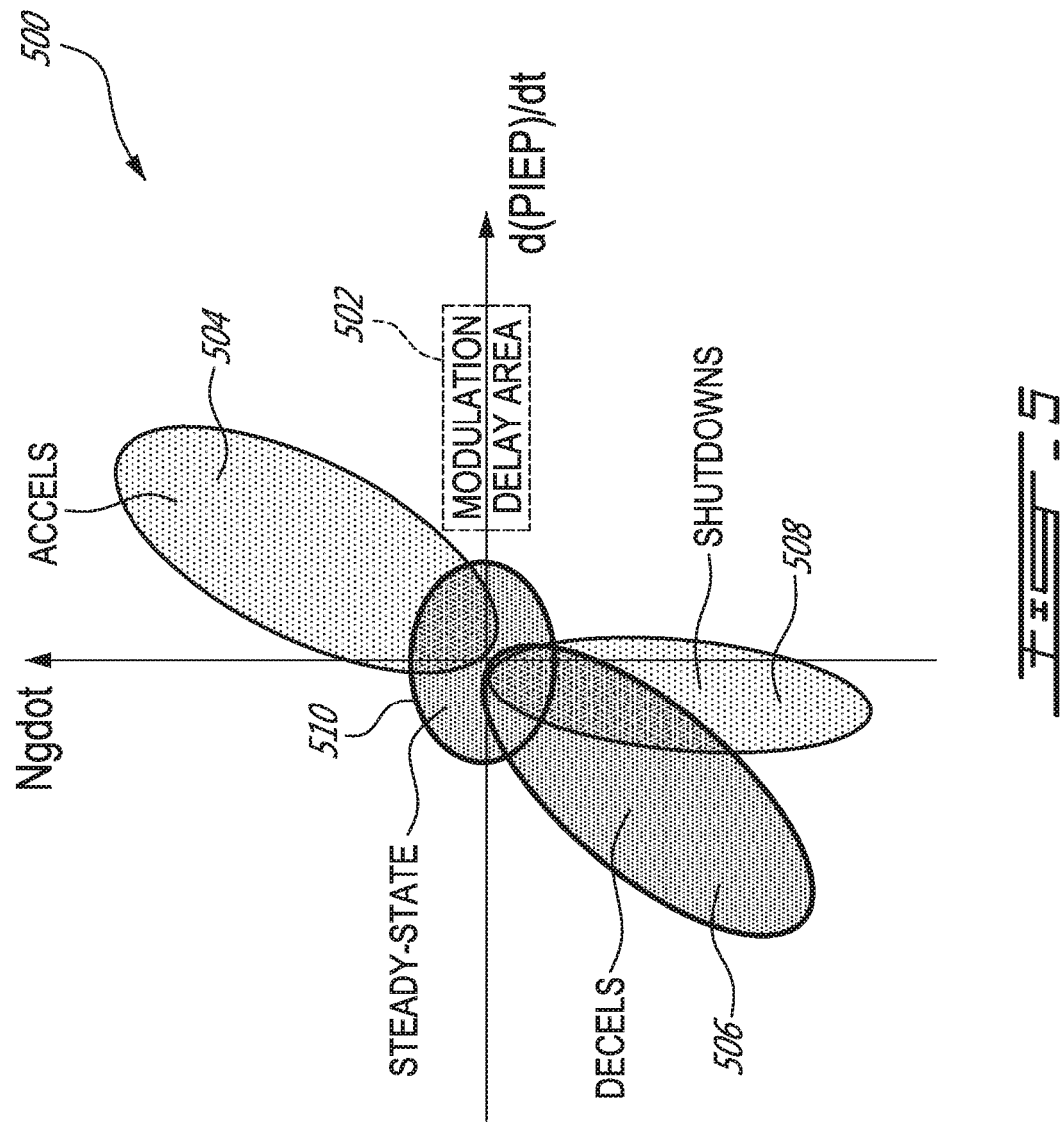
FIG. 5 is a schematic illustration of example engine operating regions and a modulation delay zone.

The PIER may be shaft horse power (SHP), a compressor pressure ratio, engine torque (Q), engine mass flow, and the like. The compressor pressure ratio may be P3/P1, P2.5/P1, and the like. Ng and the PIEP are used as a detection criterion for the modulation delay based on the engine reaction when the valve closes abruptly. The detection criterion defines an engine operating state whereby there is an increase in the PIER while the engine acceleration is slow, zero, or even negative (i.e. deceleration). This is illustrated schematically in the graph 500 of FIG. 5, where gas generator acceleration rate (Ngdot) is shown with respect to a rate of change over time of the PIEP. Various engine operating regions are illustrated, such as acceleration 504, deceleration 506, shutdown 508, and steady state 510. A modulation delay detection zone 502 is shown to be distinct from these other engine operating regions. The detection criterion is used to identify engine operation in the modulation delay detection zone 502.

Referring back to FIG. 4, at step 406 at least one ratio based on the rate of change of the gas generator speed and the rate of change of the PIEP is compared to at least one range of values. For example, in some embodiments the at least one ratio comprises a first ratio of the rate of change of the gas generator speed over time and a second ratio of the rate of change of the PIEP over time. The first and second ratios are compared to first and second ranges as follows:

$$X_1 \leq \frac{d(Ng)}{dt} \leq X_2 \qquad (1)$$

$$Y_1 \leq \frac{d(PIEP)}{dt} \leq Y_2 \qquad (2)$$

The specific quantitative values used for ranges $X_1$ to $X_2$ and $Y_1$ to $Y_2$ may be determined through testing and/or simulation, and may vary as a function of a given engine model and/or valve model. The range(s) may be set so as to include or exclude the outer bounds, as desired.

As stated above, the PIEP may be SHP, P3/P1, P2.5/P1, Q, or engine mass flow. Other parameters are also considered. In some embodiments, the time component may be eliminated by combining the first and second ratios together, such that mathematically there is only one ratio compared to one range:

$$\frac{X_1}{Y_1} \leq \frac{d(Ng)}{d(PIEP)} \leq \frac{X_2}{Y_2} \qquad (3)$$

It will be understood that other mathematical variants of equations (1), (2), and (3) may be formulated to obtain the same result. The comparison of the indirect engine parameters to one or more ranges allows a transient (i.e. time dependent) valve malfunction to be detected without using a valve command signal, which therefore allows the detection method to be used with all types of bleed valves, including those that are not directly controlled by the engine.

When the comparison performed at step 406 shows that the engine parameters are outside of the defined range(s), the method 400 continues to monitor the parameters. When the comparison shows that the engine parameters are within the defined range(s), a modulation delay of the bleed valve is detected at step 408. A signal indicative of bleed valve malfunction is transmitting at step 410, in response to detecting the modulation delay.

In some embodiments, the signal transmitted at step 410 triggers a maintenance bit or flag. In some embodiments, the signal transmitted triggers an annunciation in the cockpit of an aircraft or some other form of messaging to advise an operator of the issue. Other embodiments for triggering maintenance of the valve may also apply.

In some embodiments, the modulation delay is confirmed when the at least one ratio is found to be within the at least one range for a predetermined time period. This feature may be implemented, for example, using a clock signal as an additional parameter or by determining that the detection conditions are true for a plurality of consecutive clock cycles. The valve malfunction signal may be transmitted at step 410 only when the modulation delay has been confirmed.

In some embodiments, a degree of severity of the modulation delay may be determined. For example, instead of a binary detection criteria, the detection criteria may be multi-level. A plurality of ranges of values may be used to set out the multiple levels. For example, a first range may be associated with a first severity level, a second range may be associated with a second severity level, and a third range may be associated with a third severity level. More or less than three severity levels and/or associated ranges may be used. The signal indicative of the bleed valve malfunction may comprise information regarding the severity level of the malfunction. Alternatively or in combination therewith, the signal indicative of the bleed valve malfunction may trigger a different action depending on the severity level of the malfunction. For example, a first severity level may result in a maintenance flag, a second severity level may result in a cockpit annunciation, and a third severity level may result in an immediate maintenance of the valve. Other embodiments may also apply.

Modulation delay issues may be more severe in altitude and/or with engine deterioration. Therefore, performing the method 400 inflight may produce different results than it would on-ground, where altitude is not present. Similarly, continuous monitoring over time may allow detection of issues due to engine deterioration.

Figure 6:
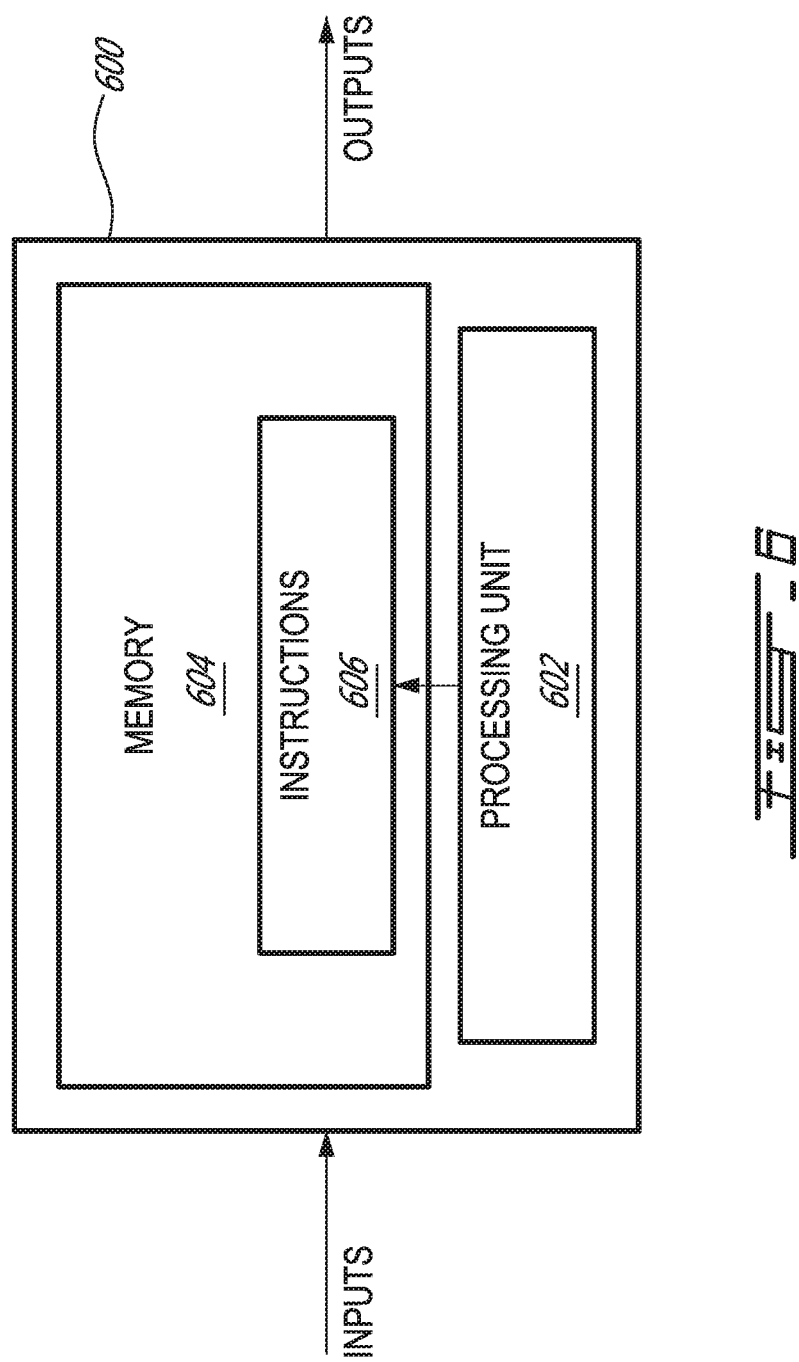
FIG. 6 is a block diagram of an example computing device for implementing the method of FIG. 4.

With reference to FIG. 6, an example of a computing device 600 is illustrated. The computing device 600 may be used to perform part or all of the method 400 of monitoring a bleed valve. In some embodiments, the method 400 is performed by an engine controller that is implemented with one or more computing devices 600. The engine controller can be implemented as part of a full-authority digital engine controls (FADEC) or other similar device, including an electronic engine control (EEC), an engine control unit (ECU), and the like. In some embodiments, a device separate from the engine controller is implemented with one or more computing devices 600 for performing part or all of the method 400.

The computing device 600 comprises a processing unit 602 and a memory 604 which has stored therein computer-executable instructions 606. The processing unit 602 may comprise any suitable devices configured to implement the method 400 such that instructions 606, when executed by the computing device 600 or other programmable apparatus, may cause the functions/acts/steps performed as part of the method 600 as described herein to be executed. The processing unit 602 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 604 may comprise any suitable known or other machine-readable storage medium. The memory 604 may comprise non-transitory computer readable storage medium, for example, but not limited to, an electronic, magnetic, optical, electromagnetic, infrared, or semiconductor system, apparatus, or device, or any suitable combination of the foregoing. The memory 504 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 604 may comprise any storage means (e.g., devices) suitable for retrievably storing machine-readable instructions 606 executable by processing unit 602.

The methods and systems for monitoring a bleed valve described herein may be implemented in a high level procedural or object oriented programming or scripting language, or a combination thereof, to communicate with or assist in the operation of a computer system, for example the computing device 600. Alternatively, the methods and systems for monitoring a bleed valve may be implemented in assembly or machine language. The language may be a compiled or interpreted language. Program code for implementing the methods and systems for monitoring a bleed valve may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for monitoring a bleed valve may also be considered to be implemented by way of a non-transitory computer-readable storage medium having a computer program stored thereon. The computer program may comprise computer-readable instructions which cause a computer, or more specifically the processing unit 602 of the computing device 600, to operate in a specific and predefined manner to perform the functions described herein, for example those described in the method 400.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, the method may be applied to any type of turbomachine having a bleed valve that needs to be modulated in operation. In addition, the range of values used to define the modulation delay area may be varied to avoid false positions, in a trade-off with performance of the detection of the modulation delay. Yet further modifications could be implemented by a person of ordinary skill in the art in view of the present disclosure, which modifications would be within the scope of the present technology.

The invention claimed is:

1. A method for monitoring a bleed valve of a gas turbine engine, the method comprising:
   determining a rate of change of a gas generator speed of the gas turbine engine;
   determining a rate of change of a parameter indicative of engine power of the gas turbine engine;
   comparing at least one ratio based on the rate of change of the gas generator speed and the rate of change of the parameter indicative of engine power to at least one range of values;
   detecting a modulation delay of the bleed valve when the at least one ratio is within the at least one range of values; and
   transmitting a signal indicative of the bleed valve malfunction in response to detecting the modulation delay.

2. The method of claim 1, wherein the at least one ratio comprises a first ratio of the rate of change of the gas generator speed over time and a second ratio of the rate of change of the parameter indicative of engine power over time, and wherein the at least one range of values comprises a first range associated with the first ratio and a second range associated with the second ratio.

3. The method of claim 1, wherein the at least one ratio comprises the rate of change of the parameter indicative of engine power and the rate of change of the gas generator speed, and wherein the at least one range of values comprises a first range associated with a first severity level and a second range associated with a second severity level.

4. The method of claim 1, wherein the parameter indicative of engine power is shaft horse power of the gas turbine engine.

5. The method of claim 1, wherein the parameter indicative of engine power is a pressure ratio of a compressor the gas turbine engine.

6. The method of claim 5, wherein the pressure ratio is of a compressor outlet pressure to a compressor inlet pressure.

7. The method of claim 1, wherein detecting the modulation delay comprises detecting the modulation delay over a predetermined time period.

8. The method of claim 1, wherein detecting the modulation delay comprises determining a degree of severity of the modulation delay.

9. The method of claim 8, wherein the signal indicative of the bleed valve malfunction comprises the degree of severity.

10. A system for monitoring a bleed valve of a gas turbine engine, the system comprising:
    a processing unit; and
    a non-transitory computer-readable medium having stored thereon program instructions executable by the processing unit for:
      determining a rate of change of a gas generator speed of the gas turbine engine;
      determining a rate of change of a parameter indicative of engine power of the gas turbine engine;
      comparing at least one ratio based on the rate of change of the gas generator speed and the rate of change of the parameter indicative of engine power to at least one range of values;
      detecting a modulation delay of the bleed valve when the at least one ratio is within the at least one range of values; and
      transmitting a signal indicative of the bleed valve malfunction in response to detecting the modulation delay.

11. The system of claim 10, wherein the at least one ratio comprises a first ratio of the rate of change of the gas generator speed over time and a second ratio of the rate of change of the parameter indicative of engine power over time, and wherein the at least one range of values comprises a first range associated with the first ratio and a second range associated with the second ratio.

12. The system of claim 10, wherein the at least one ratio comprises the rate of change of the parameter indicative of engine power and the rate of change of the gas generator speed, and wherein the at least one range of values comprises a first range associated with a first severity level and a second range associated with a second severity level.

13. The system of claim 10, wherein the parameter indicative of engine power is shaft horse power of the gas turbine engine.

14. The system of claim 10, wherein the parameter indicative of engine power is a pressure ratio of a compressor the gas turbine engine.

15. The system of claim 14, wherein the pressure ratio is of a compressor outlet pressure to a compressor inlet pressure.

16. The system of claim 10, wherein detecting the modulation delay comprises detecting the modulation delay over a predetermined time period.

17. The system of claim 10, wherein detecting the modulation delay comprises determining a degree of severity of the modulation delay.

18. The system of claim 17, wherein the signal indicative of the bleed valve malfunction comprises the degree of severity.

19. An assembly comprising:
    a gas turbine engine;
    a bleed valve in the gas turbine engine;
    at least one sensor coupled to the gas turbine engine for measuring engine parameters; and
    a controller coupled to the at least one sensor and configured for:
      determining a rate of change of a gas generator speed of the gas turbine engine;
      determining a rate of change of a parameter indicative of engine power of the gas turbine engine;
      comparing at least one ratio based on the rate of change of the gas generator speed and the rate of change of the parameter indicative of engine power to at least one range of values;
      detecting a modulation delay of the bleed valve when the at least one ratio is within the at least one range of values; and
      transmitting a signal indicative of the bleed valve malfunction in response to detecting the modulation delay.

20. The assembly of claim 19, wherein the at least one ratio comprises a first ratio of the rate of change of the gas generator speed overtime and a second ratio of the rate of change of the parameter indicative of engine power over time, and wherein the at least one range of values comprises a first range associated with the first ratio and a second range associated with the second ratio.

* * * * *